US 9,485,074 B1

(12) United States Patent
Love et al.

(10) Patent No.: US 9,485,074 B1
(45) Date of Patent: *Nov. 1, 2016

(54) METHOD AND APPARATUS FOR SCHEDULING ASYNCHRONOUS TRANSMISSIONS

(71) Applicant: Google Technology Holdings LLC, Mountain View, CA (US)

(72) Inventors: Robert T. Love, Barrington, IL (US); Amitava Ghosh, Buffalo Grove, IL (US); Ravi Kuchibhotla, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 14/514,943

(22) Filed: Oct. 15, 2014

Related U.S. Application Data

(60) Continuation of application No. 10/966,811, filed on Oct. 15, 2004, now Pat. No. 8,897,210, which is a division of application No. 10/406,179, filed on Apr. 3, 2003, now Pat. No. 6,822,969.

(51) Int. Cl.
*H04W 4/00* (2009.01)
*H04B 7/216* (2006.01)
*H04L 5/00* (2006.01)

(52) U.S. Cl.
CPC .................................. *H04L 5/0058* (2013.01)

(58) Field of Classification Search
CPC ........... H04W 56/0045; H04W 84/04; H04W 72/0446
See application file for complete search history.

(56) References Cited

U.S. PATENT DOCUMENTS 5,260,944 A 11/1993 Tomabechi
5,987,023 A 11/1999 Albrow et al.
(Continued)

FOREIGN PATENT DOCUMENTS

DE 10358333 A1 7/2005
EP 1484892 A2 12/2004
(Continued)

OTHER PUBLICATIONS

Amir, N., et al., "Towards an Automatic Classification of Emotions in Speech".
Article Sertainty-Agent Performance Optimization-2005 SE Solutions, Inc.
Article Sertainty-Automated Quality Monitoring-SER solutions, Inc.-21680, www.ser.com, Ridgetop Circle Dulles, VA., Copyright 2003.

(Continued)

*Primary Examiner* — Melanie Jagannathan
(74) *Attorney, Agent, or Firm* — Lerner, David, Littenberg, Krumholz & Mentlik, LLP

(57) ABSTRACT

The present invention provides a method of scheduling asynchronous transmissions for a plurality of subscriber units. The method includes receiving information associated with a plurality of subscriber units that have uplink data to transmit, the information including uplink timing offset information associated with each of the subscriber units. Two or more subscriber units are then selected from a set of subscriber units having a timing offset differential, that is below a predetermined threshold, where the timing offset differential is the difference between the timing offset of a first subscriber unit and the timing offset of a second subscriber unit further selectively offset by a multiple of the transmission segment size, which minimizes the difference. The transmission segments, which are available for the uplink of data, are then allocated between the selected two or more subscriber units, which limits the number of transmission segments that have at least one of an overlap or a gap, and the amount of any overlap or gap, in order to minimize wasted scheduling opportunities.

20 Claims, 7 Drawing Sheets

(56) References Cited

U.S. PATENT DOCUMENTS

| | | | |
|---|---|---|---|
| 6,072,784 | A | 6/2000 | Agrawal et al. |
| 6,081,606 | A | 6/2000 | Hansen et al. |
| 6,154,455 | A | 11/2000 | Mekkoth et al. |
| 6,195,342 | B1 | 2/2001 | Rohani |
| 6,236,646 | B1 | 5/2001 | Beming et al. |
| 6,421,334 | B1 | 7/2002 | Baines |
| 6,584,315 | B1 | 6/2003 | Kang et al. |
| 6,741,578 | B1 | 5/2004 | Moon et al. |
| 6,807,426 | B2 | 10/2004 | Pankaj |
| 6,822,969 | B2 | 11/2004 | Love et al. |
| 7,027,392 | B2 | 4/2006 | Holtzman et al. |
| 7,042,856 | B2 | 5/2006 | Walton et al. |
| 7,076,427 | B2 | 7/2006 | Scarano et al. |
| 7,117,003 | B2 | 10/2006 | Kayama et al. |
| 7,127,252 | B1 | 10/2006 | Aoki et al. |
| 7,164,919 | B2 | 1/2007 | Chen |
| 7,177,275 | B2 | 2/2007 | Stanwood et al. |
| 7,227,851 | B1 | 6/2007 | Gopalakrishnan et al. |
| 7,289,468 | B2 | 10/2007 | Yang et al. |
| 7,346,018 | B2 | 3/2008 | Holtzman et al. |
| 2002/0005898 | A1 | 1/2002 | Kawada et al. |
| 2002/0041566 | A1 | 4/2002 | Yang et al. |
| 2003/0033145 | A1 | 2/2003 | Petrushin |
| 2003/0163360 | A1 | 8/2003 | Galvin |
| 2004/0014508 | A1 | 1/2004 | Seo et al. |
| 2004/0098295 | A1 | 5/2004 | Sarlay et al. |
| 2004/0249650 | A1 | 12/2004 | Freedman et al. |

FOREIGN PATENT DOCUMENTS

| | | |
|---|---|---|
| WO | 0237856 A1 | 5/2002 |
| WO | 03067884 A1 | 8/2003 |
| WO | 2004091250 A1 | 10/2004 |

OTHER PUBLICATIONS

Bimbot, et al., A tutorial on Text-Independent Speaker Verification EURASIP Journal on Applied Signal Processing 2004:4, pp. 430-451 (2004).

Bimbot, F. Et al., "A tutorial on text-independent verification" (Aug. 8, 2003).

Chaudhari, v., et al., Very large Population Text Independent Speaker Identification Using Transformation Enhanced Multi-grained Models (Oct. 2000).

Japanese Patent Office, "Notification of Reasons for Rejection", Dec. 2, 2009, pp. 1-3, Japanese Patent Application No. 2006-509453.

KIPO's Notice of Preliminary Rejections {English Translation}, Aug. 9, 2011, all pages.

Mark, L.R., et al., "White Paper-Sertainty Quality Assurance" SER Solutions Inc. (2003-2005).

Muthusamy, Y. Et al., "Reviewing Automatic Language Identification", IEEE Signal Processing Magazine, pp. 33-41, Oct. 1994.

PCT, "Notification of Transmittal of the International Search Report or the Declaration", Jul. 3, 2008, pp. 1-7, PCT/US2004/09636, Alexandria, Virginia, USA.

Reynolds, D.A., et al., "Speaker Verification Using Adapted Gaussian Mixture Models" (Oct. 1, 2000).

Reynolds, D.R., Robust Text Independent Speaker Identification Using Gaussian Mixture Speaker Models-IEEE Transactions on Speech and Audio Processing, vol. 3, No. 1' (Jan. 1995).

Robust Test Independent Speaker. Identification Using Gaussian Mixture Speaker Models.

Zigel, Y. et al., "How to deal with multiple-targets in speaker identification systems?".

Zissman, M.A., "Comparison of four Approaches to Automatic Language Identification of Telephone Speech", IEEE Transactions on Speech and Audio Processing, vol. 4, No. 1, 31-44, 1996.

1

METHOD AND APPARATUS FOR SCHEDULING ASYNCHRONOUS TRANSMISSIONS

CROSS-REFERENCE TO RELATED APPLICATIONS

The present application is a continuation of U.S. patent application Ser. No. 10/966,811, filed Oct. 15, 2004, which is a divisional of U.S. patent application Ser. No. 10/406,179, filed Apr. 3, 2003, and issued as U.S. Pat. No. 6,822,969 on Nov. 23, 2004, the disclosure of which are incorporated herein by reference.

FIELD OF THE INVENTION

The present invention relates generally to scheduling asynchronous transmissions and, more particularly, to scheduling asynchronous transmission, based upon timing offset information received for each of the subscriber units.

BACKGROUND OF THE INVENTION

Wireless communication systems are commonly put in place to provide voice and data communications. These systems often are deployed in accordance with one or more of several well known standards, which have been developed to more readily allow for the interoperability of equipment produced by different manufacturers. While earlier systems were more principally concerned with voice communications, there has been a more recent effort to increasingly accommodate the transmission of data at ever increasing rates.

Several third generation standards have emerged, which attempt to accommodate the anticipated demands for increasing data rates. At least some of these standards support synchronous communications between the system elements, while at least some of the other standards support asynchronous communications. At least one example of a standard that supports synchronous communications includes CDMA2000. At least one example of a standard that supports asynchronous communications includes Wideband CDMA (W-CDMA).

While systems supporting synchronous communications can sometimes allow for reduced search times for handover searching and improved availability and reduced time for position location calculations, systems supporting synchronous communications generally require that the base stations be time synchronized. One such common method employed for synchronizing base stations includes the use of global positioning system (GPS) receivers, which are co-located with the base stations, that rely upon line of sight transmissions between the base station and one or more satellites located in orbit around the earth. However, because line of sight transmissions are not always possible for base stations that might be located within buildings or tunnels, or base stations that may be located under the ground, sometimes the time synchronization of the base stations is not always readily accommodated.

However, asynchronous transmissions are not without their own set of concerns. For example, the timing of uplink transmissions in an environment supporting autonomous scheduling by the individual subscribers can be quite sporadic and/or random in nature. While traffic volume is low, the autonomous scheduling of uplink transmissions is less of a concern, because the likelihood of a collision (i.e. overlap) of data from data being simultaneously transmitted by multiple subscribers is to lower. Furthermore, in the event of a collision, there is spare bandwidth available to accommodate the need for any retransmissions. However, as traffic volume increases, the likelihood of data collisions (overlap) also increases. The need for any retransmissions also correspondingly increases, and the availability of spare bandwidth to support the increased amount of retransmissions correspondingly diminishes. Consequently, the introduction of explicit scheduling by a scheduling controller can be beneficial.

However even with explicit scheduling, given the disparity of start and stop times of asynchronous communications and more particularly the disparity in start and stop times relative to the start and stop times of different uplink transmission segments for each of the non-synchronized base stations, gaps and overlaps can still occur. Gaps correspond to periods of time where no subscriber is transmitting. Overlaps correspond to periods of time where multiple subscribers are transmitting simultaneously. Both gaps and overlaps represent inefficiencies in the usage of the available bandwidth and the management of rise over thermal (ROT), which if managed more precisely can lead to more efficient usage of the available spectrum resources and a reduction in the amount of rise over thermal (ROT).

Consequently, there is a need for a method and apparatus, which more precisely schedules asynchronous communications, in a manner that minimizes and/or eliminates gaps and overlaps thus reducing the rise over thermal (ROT).

SUMMARY OF THE INVENTION

The present invention provides a method of scheduling asynchronous transmissions for a plurality of subscriber units. The method includes receiving information associated with a plurality of subscriber units that have uplink data to transmit including uplink timing offset information associated with each of the subscriber units. Two or more subscriber units are then selected from a set of subscriber units having a timing offset differential, that is below a predetermined threshold, where the timing offset differential is the difference between the timing offset of a first subscriber unit and the timing offset of a second subscriber unit further selectively offset by a multiple of the transmission segment size, which minimizes the difference. The transmission segments, which are available for the uplink of data, are then allocated between the selected two or more subscriber units, which limits the number of transmission segments that have at least one of an overlap or a gap, and the amount of the at least one of overlap and gap.

In at least one embodiment, selecting two or more subscriber units includes selecting two or more subscriber units from a list of subscriber units having the highest scheduling priority.

In at least a still further embodiment, selecting two or more subscriber units having the highest scheduling priority includes selecting the subscriber unit from the list having the highest scheduling priority and selecting at least another subscriber unit from the list, which minimizes the offset differential.

In yet a still further embodiment, the power of a scheduled uplink transmission is based upon the indicated presence and the amount of any anticipated overlap.

The present invention further provides a scheduling controller for scheduling asynchronous transmissions in a plurality of sub-frames of one or more channels for a plurality of subscriber units. The scheduling controller includes a receiver for receiving information associated with a plurality of subscriber units, each having uplink data to transmit, the information including uplink timing offset information. The scheduling controller further includes a controller adapted for selecting two or so more subscriber units having offset differentials, where the size of any one of an overlap and a gap is below a predetermined threshold, when adjacent transmission segments of a channel are allocated to different ones of the two or more subscriber units, and for allocating the transmission segments between the two or more selected subscriber units in accordance with the selection. The scheduling controller additionally includes a transmitter for transmitting to the selected two or more subscriber units the transmission segment allocations.

The present invention still further provides a subscriber unit including an uplink transmission controller for use in a subscriber unit for controlling the asynchronous transmission of uplink data. The uplink transmission controller includes a priority status module adapted for producing priority status information. The subscriber unit further includes a transmitter coupled to the priority status module for transmitting priority status information to a scheduling controller, and a receiver for receiving scheduling information. The uplink transmission controller further includes an uplink transmission timing module, coupled to the transmitter and the receiver, and adapted for selectively enabling the transmitter to asynchronously transmit the uplink data, in accordance with the received scheduling information.

These and other features, and advantages of this invention are evident from the following description of one or more preferred embodiments of this invention, with reference to the accompanying drawings.

DETAILED DESCRIPTION OF THE PREFERRED EMBODIMENT(S)

Figure 1:
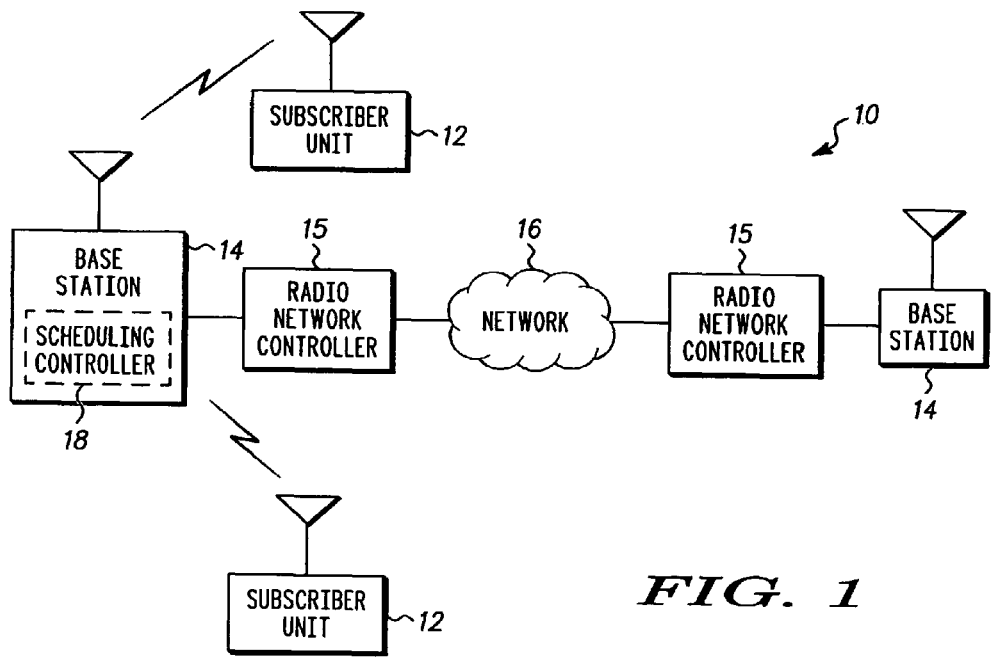
FIG. 1 is a wireless communication network, in accordance with at least one exemplary embodiment in which the present invention can be implemented.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates at least one example of an asynchronous wireless communication network 10 in which it would be suitable to incorporate the present invention. Examples of asynchronous wireless communication networks include networks, which conform to several well known standards including Global System for Mobile Communications (GSM) and Wide band CDMA (WCDMA).

The communication network 10 illustrates a pair of subscriber units 12, which communicate with at least one of a pair of base stations 14. In the same or alternative embodiments, a subscriber unit can be sometimes alternatively referred to as User Equipment (UE). In the same or alternative embodiments, a base station can be sometimes alternatively referred to as node-B or Base Transceiver Station. (BTS).

In the illustrated embodiment, the base stations 14 are each coupled to a corresponding one of a plurality of radio network controller 15. In turn, the radio network controllers 15 are each coupled to network 16, which can include wired elements as well as other wireless elements. The wired elements of network 16 can include all or portions of a public switched telephone network (PSTN). The other wireless elements can include other types of wireless communications such as paging systems, radio broadcast systems, and other cellular systems including cellular systems incorporating synchronous communications. The network 10 additionally includes one or more scheduling controllers 18. In at least one embodiment, the scheduling controllers 18 are integrated as part of and/or are coupled to one or more of the base stations 14. While the illustrated embodiment includes a scheduling controller, which is integrated with a base station, at least one embodiment is envisioned where the scheduling controller 14 could be a separate stand alone device, that separately communicates within the network. Still further, the scheduling controller could alternatively be partially or entirely integrated as part of a radio network controller 15. While a particular network configuration is illustrated, one skilled in the art will readily appreciate that alternative network configurations, including alternative coupling arrangements between the various network elements are possible without departing from the teachings of the present invention.

Figure 2:
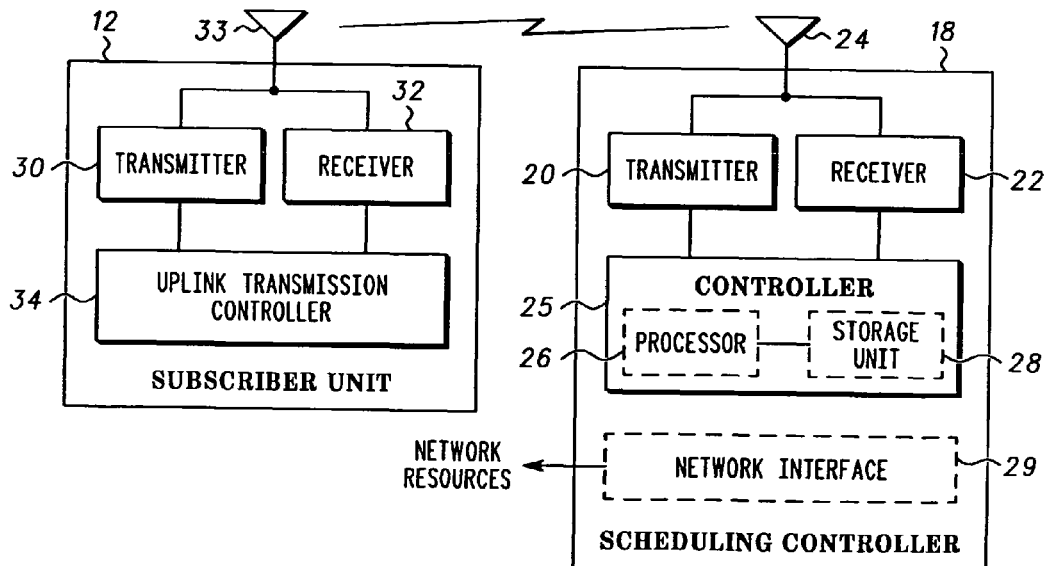
FIG. 2 is a block diagram of the subscriber unit and a scheduling controller, in accordance with at least one embodiment of the present invention.

FIG. 2 illustrates a block diagram of each of a subscriber unit 12 and a scheduling controller 18. As previously noted, the scheduling controller 18 can be incorporated as part of a base station 14. Incorporation of the scheduling controller 18 as part of a base station 14, enables the scheduling controller 18 to share transmitter 20 and receiver 22 resources with the other wireless communication capabilities of the base station. Both the transmitter 20 and the receiver 22 are each coupled to an antenna 24, which is used to receive and transmit wireless signals. Both the transmitter 20 and the receiver 22 are additionally coupled to controller 25, which facilitates the scheduling of asynchronous communications. The controller 25 can additionally be coupled to a network interface 29, which facilitates communication between the scheduling controller 18 and network resources.

In at least one embodiment, the controller includes a processor 26 and a storage unit 28. The processor 26 can include one or more microprocessors. The storage unit 28 can include one or more volatile or non-volatile, fixed or removable storage devices for storing programming instructions to be executed by the processor 26 and any corresponding program data. In some instances, one or more of the microprocessors can include one or more integrated storage elements, which can be used to store programming instructions for execution by the microprocessor and/or other data. For example, a microprocessor may have an embedded Random Access Memory (RAM) or Read Only Memory (ROM). Additionally or alternatively, the controller can incorporate logic circuitry, which manages the operation of the scheduling controller, including sequential state machines and other logic elements.

More specifically, the transmitter 20 and receiver 22 each enable the scheduling controller to communicate with a plurality of remote subscriber units 12 for the purpose of receiving information corresponding to the current operating condition of each of the relevant subscriber units 12, and for conveying transmission assignments including, possibly, information relevant to the amount of any anticipated overlap and gap.

In the illustrated embodiment, the subscriber unit 12 similarly includes a transmitter 30 and a receiver 32, coupled to an antenna 33, for use in communicating information between the subscriber unit 12 and the scheduling controller 18. Both the transmitter 30 and the receiver 32 are additionally coupled to an uplink transmission controller 34, which manages the control of at least some of the uplink transmissions including controlling the transmission timing, based upon the transmission segments allocated to the subscriber unit 12 by the scheduling controller 18, and controlling the data rates of the information transmitted, based upon the amount of any anticipated overlap and gap.

Similar to the controller 25 of the scheduling controller 18, the uplink transmission controller 34 of the subscriber unit 12 can include a processor and corresponding storage unit, as well as additionally or alternatively incorporating logic circuitry including sequential state machines and other logic elements.

Figure 3:
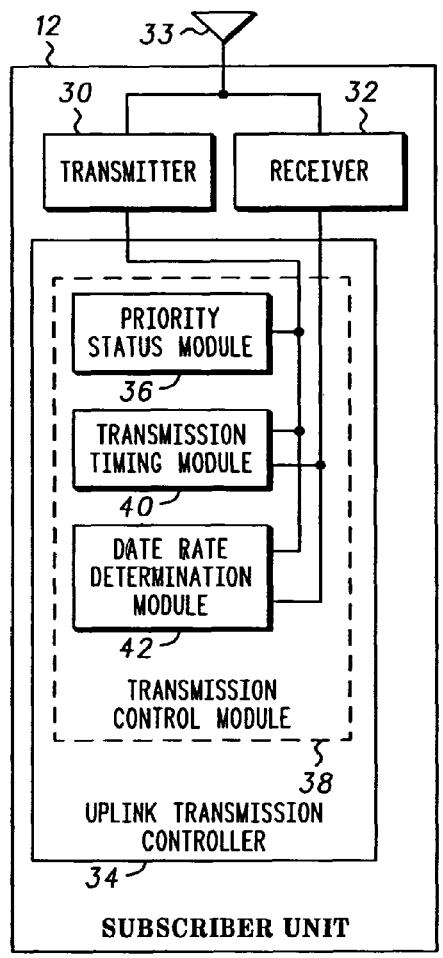
FIG. 3 is a more detailed block diagram of a subscriber unit, incorporating an uplink transmission controller for controlling the asynchronous transmission of uplink data.

A more detailed block diagram of the subscriber unit 12 is illustrated in FIG. 3. In FIG. 3, the uplink transmission controller 34 includes a plurality of modules. Each module can correspond to a set of programming instructions organized into a set of one or more program routines, additionally or alternatively, each module can correspond to a set of interconnected circuit elements for accomplishing a specific task. In some instances, the modules may share all or some of the program routines, data elements, and/or circuit elements.

In the illustrated embodiment, the uplink transmission controller 34 of the subscriber unit 12 includes a priority status module 36 and a transmission control module 38, which has a transmission timing module 40 and a data rate determination module 42. The priority status module 36 is coupled to the transmitter 30, and produces and manages the subscriber unit's priority status information. This information can include one or more of the delay since the subscriber unit 12 was last scheduled to upload data, the current maximum achievable data rate of the subscriber unit 12, which can be a function of the current available power margin, the amount of data in the queue ready to be transmitted, relative to the queue size, and a quality of service status. Other types of information may also be suitable. All or some of this information is supplied to the scheduling controller 18 for purposes of determining the allocation of transmission segments.

The transmission control module 38 is coupled to both the transmitter 30 and the receiver 32, in which the included transmission timing module 40 and data rate determination module 42, are also each coupled to the transmitter 30 and the receiver 32. The transmission timing module 40 receives transmission segment assignments, based upon the transmission segment allocations made by the corresponding scheduling controller 18, and provides control signals to the transmitter 30 for managing the timing of uplink transmissions. The data rate determination module 42 receives information concerning any anticipated overlap from the scheduling controller 18 during a transmission segment in which the subscriber unit 12 is assigned to transmit, and based upon the amount of any overlap, the data rate determination module 42 will produce control signals for adjusting the data rate of the uplink transmission.

By decreasing the data rate, and accommodating the insertion of additional error correction bits, the uplink transmission has a better chance of successfully receiving and decoding information despite the presence of a known interference source. Preferably, the amount of any overlap can be minimized to minimize the need, if any, to reduce the data rate, based upon overlap, and the likelihood that the transmission segment will need to be retransmitted as a result of an inability to accurately decode the transmitted segment.

Figure 4:
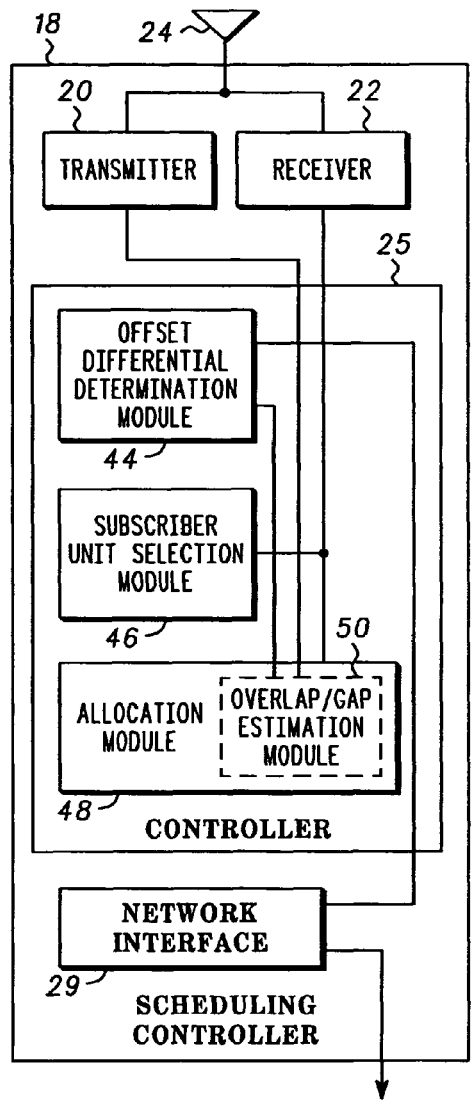
FIG. 4 is a more detailed block diagram of a scheduling controller.

FIG. 4 illustrates a more detailed block diagram of the scheduling controller 18. Similar to the uplink transmission controller 34 of the subscriber unit 12, the controller 25 of the scheduling controller 18 includes a plurality of modules, which similar to the modules of the uplink transmission controller 34 can correspond to one or more sets or programming routines and/or a set of circuit elements, which can be selectively shared between the different modules.

In the illustrated embodiment, the controller 25 includes an offset differential determination module 44 for receiving uplink timing offset information for each of the subscriber units 12 and determining corresponding offset differentials. In at least one embodiment, the uplink timing offset information is provided to the scheduling controller 18 by the radio network controller 15, via the network interface 29. However, in one or more alternative embodiments, the timing offsets for each of the subscriber units 12 is determined directly by the scheduling controller 18, from the information received from the subscriber unit 12, via the receiver 22. Where the timing offsets are determined directly, the scheduling controller may not include a network interface 29.

The determined offset differentials are received by a subscriber unit selection module 46, which prioritizes and selects the subscriber units, based upon the received offset differentials and possibly other priority information received from the subscriber units 12.

The selected subscriber units 12 are then supplied to the allocation module 48, coupled to the offset determination module 44, the subscriber unit selection module 46 and the transmitter 20, which allocates the transmission segments among the one or more of the selected subscriber units 12. The transmission segment allocations are then transmitted to the respective subscriber units 12. In at least a further embodiment, the allocation module 48 additionally includes an overlap/gap estimation module 50, which estimates any anticipated amount of overlap and gap. The amount of any anticipated overlap and gap is then supplied to the respective subscriber units 12, with the transmission segment allocation information. As noted previously, the amount of any anticipated overlap and gap can be used to adjust the uplink data rate.

Figure 5:
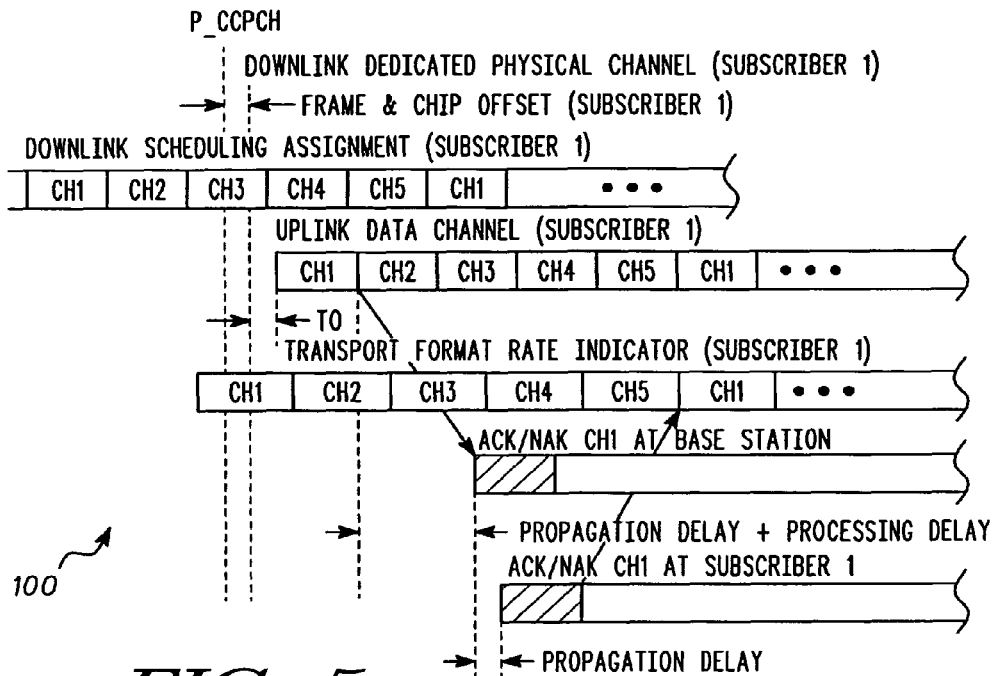
FIG. 5 is an exemplary timing diagram for asynchronous communication, in so accordance with at least one transmission format.

FIG. 5 illustrates an exemplary timing diagram 100 for the transmissions of a single subscriber using asynchronous communication, in accordance with at least one transmission format. The timing diagram 100 is consistent with the timing used in connection with Wideband CDMA (W-CDMA). Because the standard expressly provides for the use of asynchronous communication, the transmission start times relative to one another will generally not coincide. As part of managing the various start times, the base station defines a frame plus chip offset for each of the subscribers. When a subscriber is handed off to another base station, the new base station establishes its frame plus chip offset for the subscriber based on information received from the radio network controller such that the subscriber receives the downlink transmission from the new base station within its slew buffer. A new frame plus chip offset is necessary as a result of being handed off to a new base station, because the different base stations are not time synchronized, relative to one another. Consequently, a frame plus chip offset for a subscriber unit relative to one base station will not be the same relative to another base station.

For two subscribers, whose start times generally do not coincide, if adjacent transmission segments of the same uplink data channel are assigned to the two subscribers, there will most likely be either a gap or an overlap proximate the transmission segment transition point. This is because the stop time of the earlier transmitted transmission segment from the first subscriber will not coincide with the start time of the later transmitted transmission segment from the second subscriber. If a gap occurs, than no data will be transmitted during the period of time corresponding to the gap. If an overlap occurs, than during the overlap both subscriber units are transmitting portions of the corresponding transmission segments, simultaneously. During this time each transmitted signal potentially interferes with the other transmitted signal during the duration in which they are being simultaneously transmitted.

At least one embodiment attempts to minimize gaps and/or overlaps by selecting subscriber units for assignment to transmit during adjacent transmission, segments, which have minimal offset differentials, or whose offset differential coincides with as close to an even multiple of the transmission segment size. In so doing, the amount of gap and/or overlap is minimized.

In FIG. 5, the frame plus chip offset is referenced relative to the reception of a common downlink channel (P_CCPCH). The transmission time difference between the start of the transmission of the downlink dedicated physical channel and the common downlink channel defines the frame plus chip offset. In the illustrated embodiment, prior to the transmission of data on an uplink data channel, the mobile subscriber receives a downlink scheduling assignment on a scheduling assignment channel. The scheduling information for each transmission segment can be transmitted, separately, or alternatively the scheduling information for multiple transmission segments can be encoded and transmitted together.

The start time of the transmission of data on an uplink data channel for a subscriber relative to the corresponding downlink dedicated physical channel is a time period that is delayed by an amount referred to as $T_0$. In at least one embodiment, $T_0$ is 1024 chips. In the illustrated embodiment, the rate at which the subscriber unit is transmitting information to the base station is conveyed to the base station as part of a transport format rate indicator channel. The rate information is transmitted sufficiently in advance of the corresponding transmission segment, so that the base station can adapt as necessary to accommodate the indicated rate.

In the illustrated embodiment, time is broken up into 10 ms segments. Each 10 ms period corresponds to a frame. Each frame is divided into five 2 ms sub-frames. Each sub-frame can further be broken down into three slots. Each 10 ms frame includes 38,400 chips. In the illustrated embodiment, each transmission segment corresponds to each of the 2 ms sub-frames. However, other transmission segment sizes can be alternatively defined without departing from the teachings of the present invention.

For purposes of timing, a 10 ms segment is broken down into 75 different 512 chip segments, numbered 0-74. The 75 different 512 chip segments corresponds to the granularity with which the frame plus chip offset is defined. This insures that the timing of the subscriber unit is never more than 256 chips away from the boundaries of one of the 512 chip segments. In order to accommodate this level of granularity, in terms of timing, a slew buffer of 256 chips corresponding to a de-skewer span is maintained (148 chips for base station offset+108 chips for delay spread). The subscriber unit will pay attention to transmissions that fall within the de-skewer span for making adjustments to the transmitter power level. While the present embodiment has been described using a particular timing granularity and slew buffer size, one skilled in the art will readily recognize that the present invention could be adapted to accommodate finer or coarser granularity in terms of offset timing, as well as accommodate different slew buffer sizes without departing from the teachings of the present invention.

After a data segment is received, a positive or negative acknowledgement is produced by the receiving base station and transmitted to the subscriber unit, whose start time corresponds to the propagation delay of the uplink data channel and the delay associated with processing the received data. The subscriber unit, when is scheduled again, can then transmit a new packet or re-transmit the old packet depending on whether it decoded the acknowledgement as positive or negative.

Figure 6:
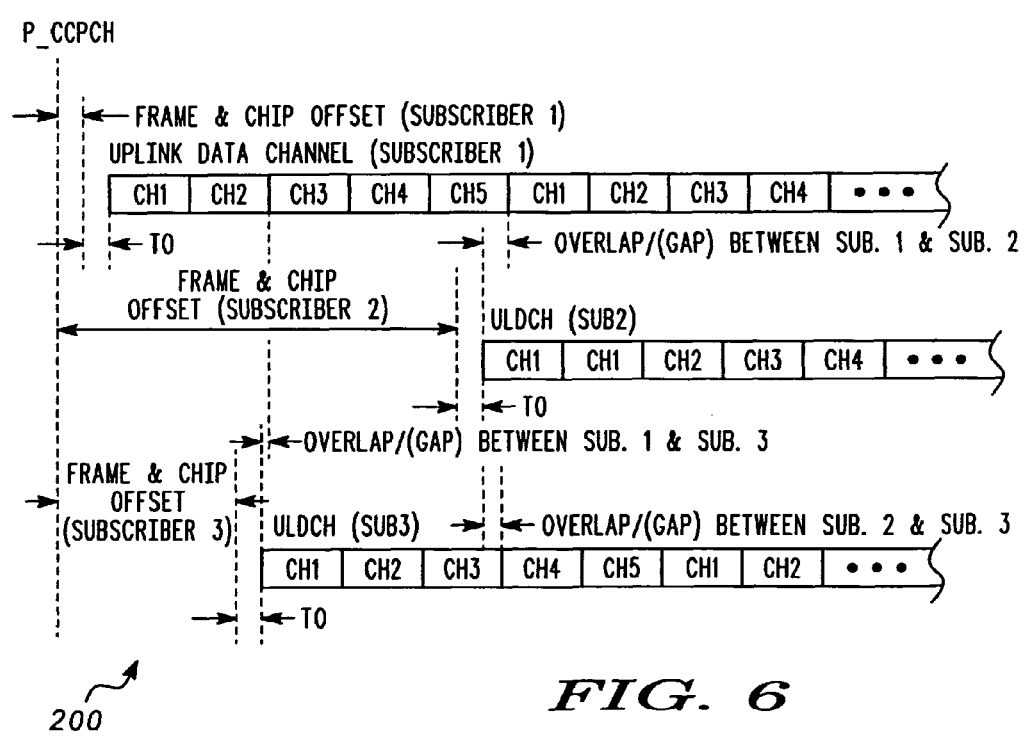
FIG. 6 is an exemplary relative timing diagram for multiple subscribers, relative to a common downlink channel.

FIG. 6 illustrates a timing diagram 200 illustrating an example of the timing relationship between three subscriber units. As noted above, the frame plus chip offset is measured relative to a common timing reference. In the illustrated embodiment, the common timing reference is the common downlink channel (P_CCPCH).

FIG. 6 further illustrates a timing offset differential, which corresponds to the difference between the start time of a transmission segment for a first subscriber unit and the start time of a transmission segment for a second subscriber unit, that is transmitted closest in time to the start time of the transmission segment of the first subscriber unit.

An exemplary overlap/gap is illustrated relative to each of the subscriber pairs. While the timing offset difference between subscriber 1 and subscriber 2 is identified as an overlap, the timing differential would only produce an overlap if subscriber 2 so transmitted in the adjacent segment after the preceding transmission segment transmitted by subscriber 1. If the transmission segment transmitted by subscriber 2 preceded the adjacent transmission segment transmitted by subscriber 1, than a corresponding gap would occur. In the present example, among the three subscribers, subscriber 1 and subscriber 3 have the smallest timing differential. Consequently, subscriber 3 could transmit a transmission segment in an adjacent transmission segment after subscriber 1 and minimize the relative amount of overlap.

Furthermore, if subscriber 1 was assigned to transmit transmission segments on sub-frames 1 through 3 (CH1-CH3), and if the next adjacent transmission segment was to be assigned to subscriber 3, then subscriber 3 would be instructed to transmit the transmission segments beginning with sub-frame 2 (CH2), which would coincide with sub-frame 4 (CH4) of subscriber 1. As noted above, the subscriber units may accommodate any overlap by adjusting transmission rates for the particular segments in which overlap is anticipated to occur.

In selecting the multiple subscribers that will be assigned to transmit using adjacent transmission segments an attempt is made to minimize any resulting overlap. However the decision to allocate a transmission segment can additionally take into account priority information. In at least one embodiment, the first subscriber unit selected for allocation of transmission segments will be the subscriber unit having the highest priority. A second subscriber unit can then be selected for the allocation of subsequent transmission segments, which minimizes the timing offset differential relative to first selected subscriber unit, from among the other subscriber units that have data to be uploaded. Alternatively, the second subscriber can be selected from a more limited subset of the other subscriber units, which includes the subscriber units that have the highest priorities.

In at least a still further alternative embodiment, the two or more subscriber units for allocation of transmission segments are the subscriber units having the smallest timing offset differential, which are both included in a subset of the subscriber units having the highest priorities.

The priority of a subscriber unit can be affected by the delay since the subscriber unit last transmitted a timing segment. The priority of a subscriber unit can so also be affected by amount of data in the queue, which in at least some instances will take into consideration the amount of data in the queue relative to the queue size, The priority status of a subscriber unit may also take into consideration the power level information, power margin information, and the requested/required quality of service. In at least one embodiment, there is generally a goal to minimize wasted scheduling opportunities.

Figure 7:
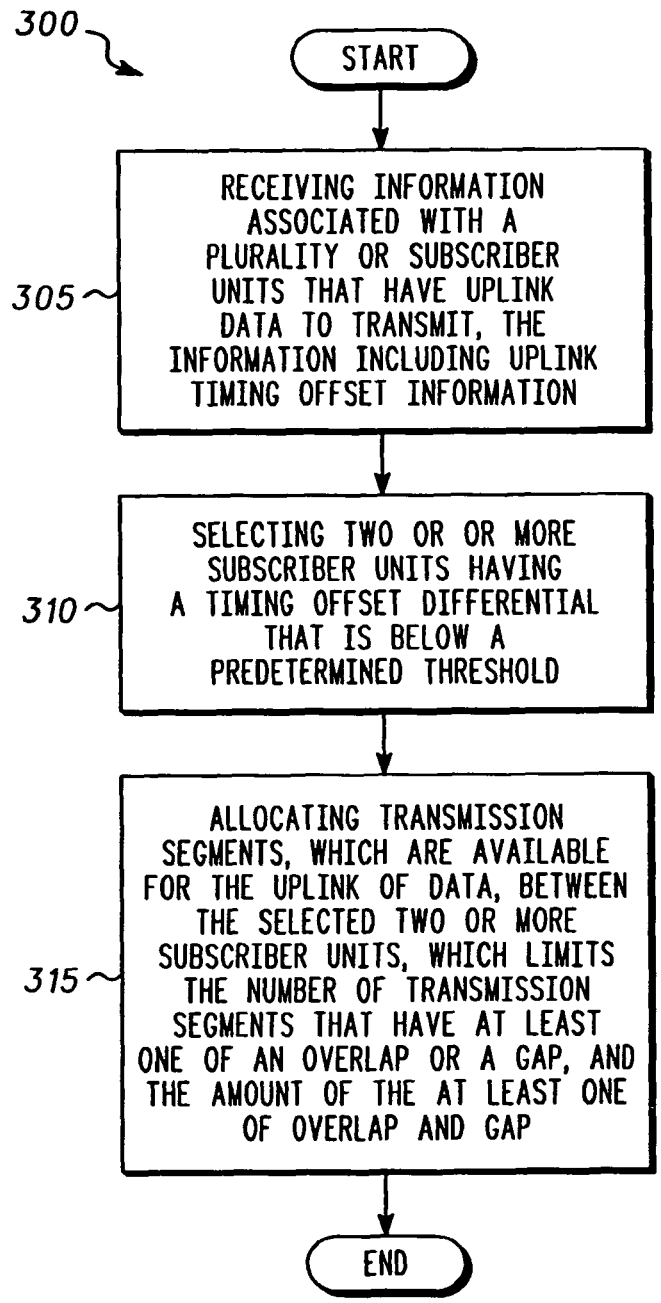
FIG. 7 is a flow diagram of a method for scheduling asynchronous transmissions for a plurality of subscriber units, in accordance with at least one embodiment of the present invention.

FIG. 7 illustrates a flow diagram of a method 300 for scheduling asynchronous transmissions for a plurality of subscriber units, in accordance with at least one embodiment of the present invention. Generally, the flow diagrams, illustrated in FIGS. 7-10, can be implemented in circuitry or as prestored sets of programming instructions, which can be executed on a microprocessor.

The method 300 includes receiving information associated with a plurality of subscriber units that have uplink data to transmit, the information including uplink timing offset information 305. Two or more subscriber units are then selected 310, which have a timing offset differential that is below a predetermined threshold. Transmission segments, which are available for the uplink of data, are then allocated between the selected two or more subscriber units, which limits the number of transmission segments that have at least one of an overlap or a gap, and the amount of any overlap and gap 315.

Generally, the predetermined threshold corresponds to a preselected limit defining a maximum allowable timing offset differential. In some instances the selected value of predetermined threshold can be a function of other conditions or elements. For example, the predetermined threshold can be a function of the available noise margin. In other instances, the predetermined threshold might be determined experimentally, relative to one or more sets of expected operating conditions. In at least one embodiment, the predetermined threshold is generally smaller than the transmission segment size.

In at least one embodiment, the scheduling of asynchronous transmissions is performed by a scheduling controller, which can be incorporated as part of a cellular base station.

Figure 8:
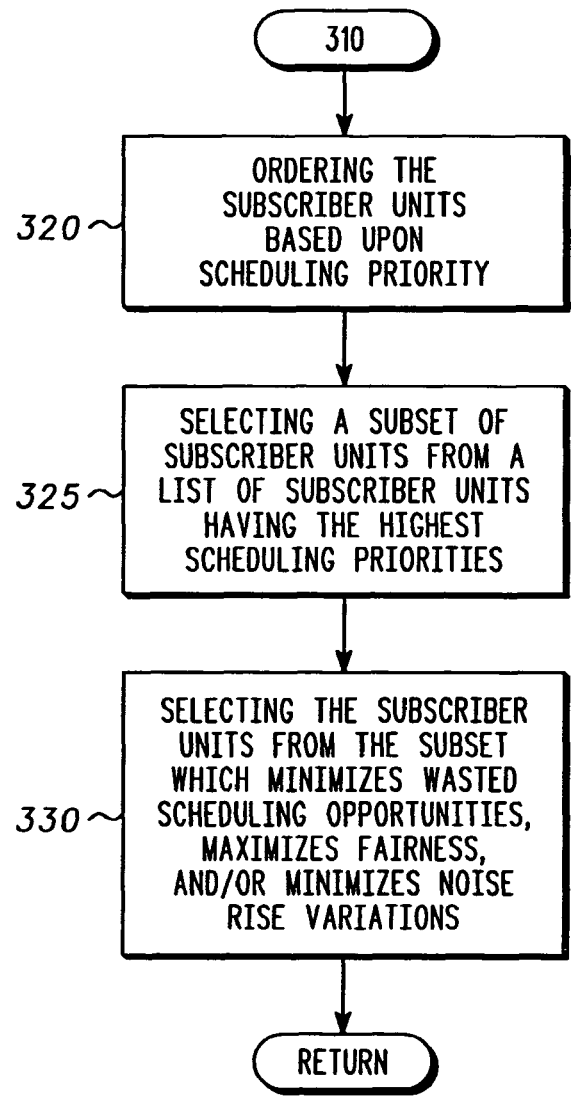
FIG. 8 is a more detailed flow diagram for selecting subscriber units for the allocation of transmission segments.

FIG. 8 is a more detailed flow diagram for selecting subscriber units for the allocation of transmission segments 310, in accordance with at least one embodiment. The selection of subscriber units 310 includes ordering the subscriber units based upon scheduling priority 320. The subscriber units are then selected from the list of subscriber units having the highest scheduling priorities 325. Subscriber units from the subset are then selected, which minimizes wasted scheduling opportunities, maximizes fairness, and/or minimizes noise rise variations 330.

Figure 9:
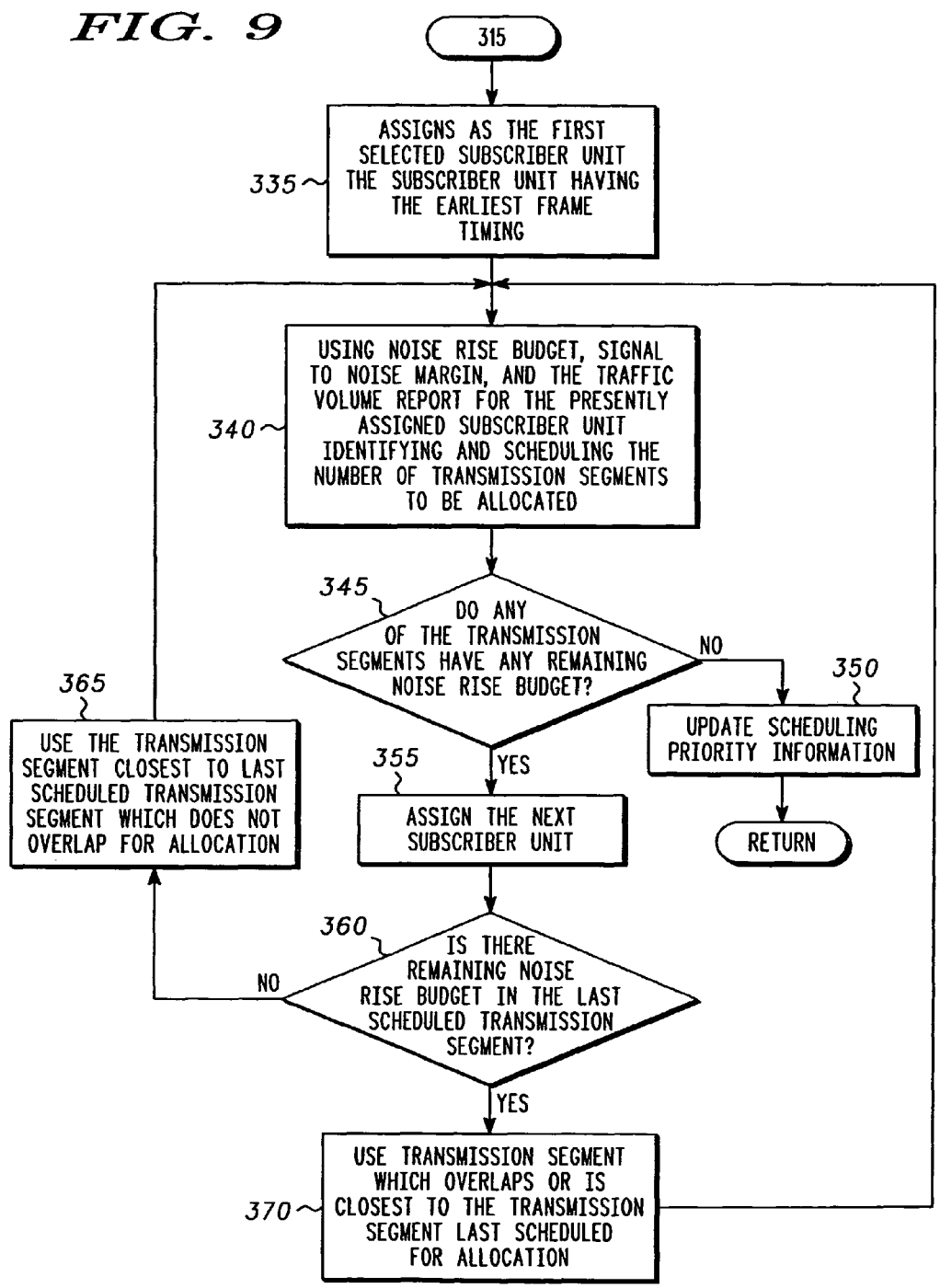
FIG. 9 is a more detailed flow diagram for allocating transmission segments, which are available for the uplink of data.

FIG. 9 is a more detailed flow diagram for allocating transmission segments 315, which are available for the uplink of data, in accordance with at least one embodiment. The allocation of transmission segments 315 includes assigning as the first selected subscriber unit, the subscriber unit having the earliest frame timing 335. A number of transmission segments to be allocated are then identified and scheduled 340, using noise rise budget, signal-to-noise margin, and the traffic volume report for the presently assigned subscriber unit. A determination is then made 345, whether any of the transmission segments have any remaining noise rise budget. If there is no remaining noise rise budget, then the scheduling priority information is updated 350. Otherwise, the next subscriber unit is assigned 355.

A determination is then made 360, as to whether there is any remaining noise rise budget in the last scheduled transmission segment. If there is remaining noise rise budget in the last scheduled transmission segment, then the transmission segment, which overlaps or is closest to the transmission segment last scheduled is used for allocation 370. If there is not any remaining noise rise budget in the last scheduled transmission segment, then the transmission segment, which is closest to and does not overlap the last scheduled transmission segment, is used for allocation 365. The identification and scheduling of the number of transmission segments to be allocated 340 is repeated, until none of the transmission segments have any remaining noise rise budget.

Figure 10:
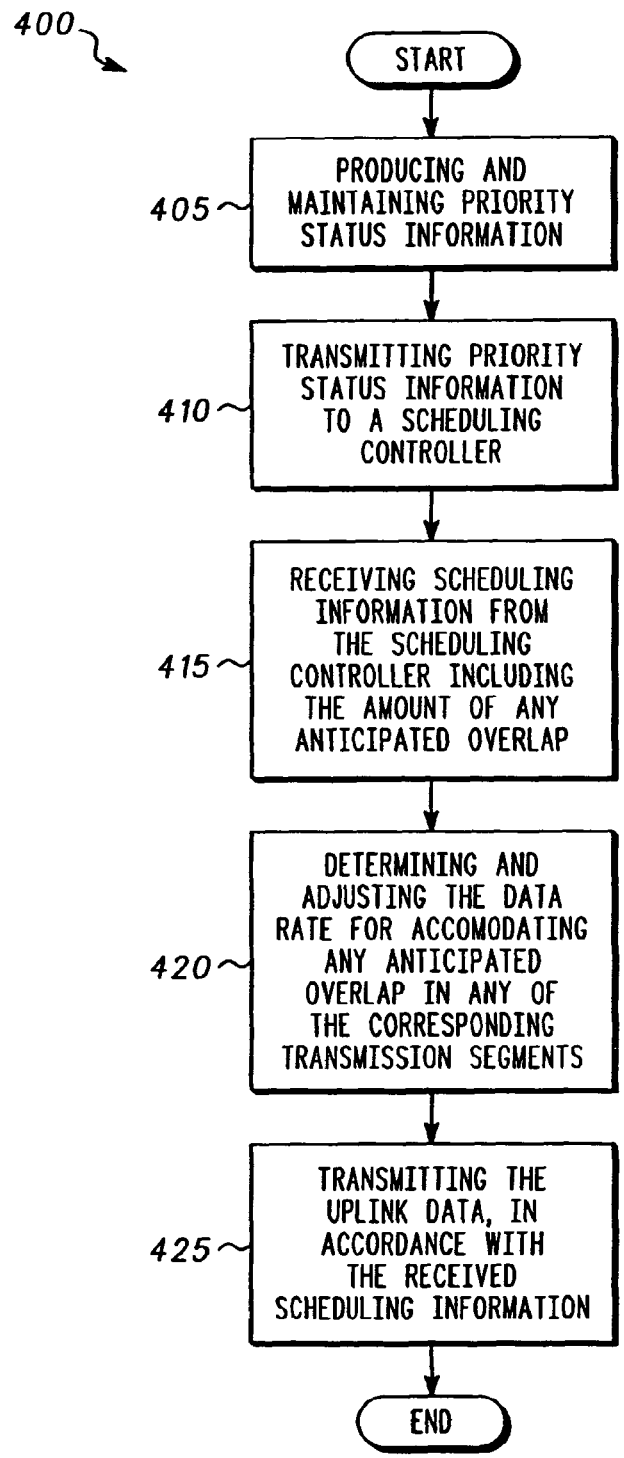
FIG. 10 is a flow diagram of a method for managing the transmission of uplink data.

FIG. 10 is a flow diagram of a method 400 for managing the transmission of uplink data, in accordance with at least one embodiment. Generally, the method for managing the transmission of uplink data is performed by one or more of the subscriber units. The method 400 includes producing and maintaining priority status information 405. The priority status information is then transmitted 410 to the scheduling controller. Scheduling information including the amount of any anticipated overlap is then received 415 from the scheduling controller.

The data rate is determined and adjusted 420 for accommodating any anticipated overlap in any of the corresponding transmission segments. The uplink data is then transmitted 425, in accordance with the received scheduling information.

While the preferred embodiments of the invention have been illustrated and described, it is to be understood that the invention is not so limited. Numerous modifications, changes, variations, substitutions and equivalents will occur to those skilled in the art without departing from the present invention as defined by the appended claims. For example, while the present examples largely are directed to over the air asynchronous data communications, the present invention may similarly be beneficial to asynchronous data communications that are generally confined to physical point to point connections. Such physical point to point connections can include wired connections, which conduct electrical signals, optical fiber, which conduct optical signals, or any other suitable form for facilitating the transmission of information. Still further the present embodiment has largely been directed to asynchronous type communication, however, the teachings of the present invention may also be beneficial to the scheduling of synchronous data transmission from multiple sources, where there is a possibility that the start and stop times of the data transmissions from the multiple sources can cause significant gaps and/or overlaps, if the transmissions are not suitably managed.

What is claimed is:

1. A method for scheduling asynchronous transmissions for a plurality of subscriber units, the method comprising:
    identifying, using one or more processors, a set of subscriber units from the plurality of subscriber units, each subscriber unit in the set being associated with uplink data to transmit and a timing offset related to transmission of the uplink data by the subscriber unit;
    determining, using the one or more processors, a timing offset differential between a first subscriber unit and a second subscriber unit from the set, the timing offset differential being a difference between the timing offset associated with the first subscriber unit and the timing offset associated with the second subscriber unit; and
    when the timing offset differential is below a predetermined threshold, assigning, using the one or more processors, segments of the uplink data to be transmitted between the first subscriber unit and the second subscriber unit, the assigned segments being configured to limit a likelihood of a collision of data between the first and second subscriber units.

2. The method of claim 1, wherein the timing offset information includes a frame offset and a chip offset.

3. The method of claim 1, further comprising selecting subscriber units having a highest scheduling priority from the set.

4. The method of claim 3, wherein the scheduling priority is related to a delay from when a given subscriber unit in the set was last scheduled to transmit data.

5. The method of claim 3, wherein the scheduling priority is related to a current maximum achievable data rate for a given subscriber unit in the set.

6. The method of claim 5, wherein the current maximum achievable data rate of the given subscriber unit is determined by a current available power margin for the given subscriber unit.

7. The method of claim 3, wherein the scheduling priority is related to an amount of uplink data ready to be transmitted.

8. The method of claim 3, wherein the scheduling priority is related to a signal-to-noise ratio of a signal received from a selected subscriber unit in the set.

9. The method of claim 3, wherein the scheduling priority is related to a quality of service status received from a given subscriber unit in the set.

10. The method of claim 1, wherein assigning the segments includes transmitting, on a downlink control channel, information regarding the assigned segments to a given subscriber unit of the set.

11. A scheduling controller for scheduling asynchronous transmissions for a plurality of subscriber units, the controller comprising:
    a memory storing uplink data to transmit; and
    one or more processors coupled to the memory, the one or more processors being configured to:
    identify a set of subscriber units from the plurality of subscriber units, each subscriber unit in the set being associated with the uplink data from the memory and a timing offset related to transmission of the uplink data by the subscriber unit;
    determine a timing offset differential between a first subscriber unit and a second subscriber unit from the set, the timing offset differential being a difference between the timing offset associated with the first subscriber unit and the timing offset associated with the second subscriber unit; and
    when the timing offset differential is below a predetermined threshold, assign segments of the uplink data to be transmitted between the first subscriber unit and the second subscriber unit, the assigned segments being configured to limit a likelihood of a collision of data between the first and second subscriber units.

12. The controller of claim 11, wherein the timing offset information includes a frame offset and a chip offset.

13. The controller of claim 11, wherein the one or more processors are further configured to select subscriber units having a highest scheduling priority from the set.

14. The controller of claim 13, wherein the scheduling priority is related to a delay from when a given subscriber unit in the set was last scheduled to transmit data.

15. The controller of claim 13, wherein the scheduling priority is related to a current maximum achievable data rate for a given subscriber unit in the set.

16. The controller of claim 15, wherein the current maximum achievable data rate of the given subscriber unit is determined by a current available power margin for the given subscriber unit.

17. The controller of claim 13, wherein the scheduling priority is related to an amount of uplink data ready to be transmitted.

18. The controller of claim 13, wherein the scheduling priority is related to a signal-to-noise ratio of a signal received from a selected subscriber unit in the set.

19. The controller of claim 13, wherein the scheduling priority is related to a quality of service status received from a given subscriber unit in the set.

20. The controller of claim 11, wherein to assign the segments includes transmitting, on a downlink control channel, information regarding the assigned segments to a given subscriber unit of the set.

* * * * *